(12) United States Patent
Shirasaki

(10) Patent No.: US 10,938,235 B2
(45) Date of Patent: Mar. 2, 2021

(54) CHARGING-DISCHARGING DEVICE, CHARGING-DISCHARGING SYSTEM, AND CHARGING-DISCHARGING CONTROL METHOD

(71) Applicant: MITSUBISHI ELECTRIC CORPORATION, Tokyo (JP)

(72) Inventor: Yoshiyuki Shirasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/969,440

(22) PCT Filed: Jul. 4, 2019

(86) PCT No.: PCT/JP2019/026651
§ 371 (c)(1),
(2) Date: Aug. 12, 2020

(65) Prior Publication Data
US 2021/0013734 A1 Jan. 14, 2021

(51) Int. Cl.
*H02J 7/00* (2006.01)
*H02J 7/35* (2006.01)
(Continued)

(52) U.S. Cl.
CPC .............. *H02J 7/35* (2013.01); *H02J 3/003* (2020.01); *H02J 7/00032* (2020.01);
(Continued)

(58) Field of Classification Search
CPC ........................................................ H02J 7/35
(Continued)

(56) References Cited

U.S. PATENT DOCUMENTS

| 6,380,715 | B1 * | 4/2002 | Kubo | H02J 3/32 |
| | | | | 320/128 |
| 7,940,032 | B2 * | 5/2011 | Kim | G05F 1/67 |
| | | | | 323/283 |

(Continued)

FOREIGN PATENT DOCUMENTS

| JP | 2014-236541 A | 12/2014 |
| JP | 2015-177717 A | 10/2015 |

(Continued)

*Primary Examiner* — Yalkew Fantu
(74) *Attorney, Agent, or Firm* — Birch, Stewart, Kolasch & Birch, LLP

(57) ABSTRACT

A charging-discharging device includes a selection unit to acquire estimated load power data indicating estimation of power to be consumed by an electric load, to acquire estimated solar power-generation power data indicating estimation of power to be generated by a solar power generation system, and to select one of a plurality of specific operations regarding usage of power on the basis of the estimated load power data, the estimated solar power-generation power data, operational mode data indicating an operational mode that identifies a power utilization method, price data indicating a price of AC power to be supplied from a commercial system and a price of AC power to be supplied to the commercial system, power conversion efficiency data indicating power conversion efficiency of a power converter at the time of charging or discharging a storage battery, and current time data.

4 Claims, 8 Drawing Sheets

(51) Int. Cl.
    *H02J 3/00*        (2006.01)
    *H02J 7/04*        (2006.01)
(52) U.S. Cl.
    CPC .... *H02J 7/00712* (2020.01); *H02J 7/007188* (2020.01); *H02J 7/04* (2013.01); *H02J 2300/24* (2020.01); *H02J 2310/12* (2020.01); *H02J 2310/64* (2020.01)
(58) Field of Classification Search
    USPC ........................................................ 320/137
    See application file for complete search history.

(56)                References Cited

U.S. PATENT DOCUMENTS

| 2010/0194340 | A1* | 8/2010 | Lim  | H01M 10/486 |
|              |     |        |      | 320/116 |
| 2011/0156653 | A1* | 6/2011 | Lai  | H02J 7/35 |
|              |     |        |      | 320/134 |
| 2011/0175451 | A1* | 7/2011 | Moon | H02J 3/381 |
|              |     |        |      | 307/66 |

FOREIGN PATENT DOCUMENTS

| JP | 2016-63629 A   | 4/2016 |
| JP | 2016-163384 A  | 9/2016 |
| JP | 2017-108560 A  | 6/2017 |
| JP | 2019-68667 A   | 4/2019 |

\* cited by examiner

CHARGING-DISCHARGING DEVICE, CHARGING-DISCHARGING SYSTEM, AND CHARGING-DISCHARGING CONTROL METHOD

FIELD

The present invention relates to a charging-discharging device, a charging-discharging system, and a charging-discharging control method to control charging and discharging of a storage battery.

BACKGROUND

In recent years, as electric vehicles are widely used, a power supply system called "Vehicle to Home (V2H) system" is becoming widespread. In the V2H system, power stored in a storage battery installed in an automobile is used for household and other purposes. The automobile described above is, for example, an electric vehicle. In the following descriptions, the electric vehicle is described as "EV".

In the V2H system, power generated using solar light, grid power supplied from a power supplier, and power stored in the storage battery are used in combination. A user can store in the storage battery one or both of a surplus of the power generated using solar light and power supplied from a power supplier during the night-time at a relatively low electricity rate. In this case, even when it is cloudy with a relatively small amount of solar radiation and thus a supply of power generated using solar light becomes unstable, a user can still use the power stored in the storage battery. This can reduce the purchase of power to be supplied from the power supplier during the daytime at a relatively high electricity rate.

There is a conventionally proposed control device that acquires an estimated value of solar-radiation amount by using weather data obtained from a weather sensor, and creates an optimum operational plan for a storage battery on the basis of the acquired estimated value of solar-radiation amount, so that the control device controls charging and discharging of the storage battery with a relatively small amount of calculation (see, for example, Patent Literature 1).

CITATION LIST

Patent Literature

Patent Literature 1: Japanese Patent Application Laid-open No. 2014-236541

SUMMARY

Technical Problem

The conventionally control device controls charging and discharging of the storage battery in accordance with the optimum operational plan created by using the weather data. However, the optimum operational plan does not take into account the electricity rate charged by a power company and the power selling/purchasing unit price. That is, there is a problem in that economic efficiency is not reflected in the control of the storage battery in accordance with the optimum operational plan.

The optimum operational plan also does not take into account the power conversion efficiency of a power converter at the time of charging or discharging the storage battery. The power converter is a device having a function of converting AC power to DC power and a function of converting DC power to AC power. In a case where a relatively small amount of power is continuously discharged from the storage battery, the power conversion efficiency of the power converter in converting DC power discharged from the storage battery to AC power is reduced. Thus, the amount of power to be purchased from a power supplier by a user is not decreased. The power supplier supplies power containing fossil fuel-derived power. Consequently, there is also a problem in that the control of the storage battery in accordance with the optimum operational plan does not always improve environmental friendliness.

The present invention has been achieved to solve the above problems, and an object of the present invention is to provide a charging-discharging device that controls charging and discharging of a storage battery by taking into account both economic efficiency and environmental friendliness.

Solution to Problem

In order to solve the above problems and achieve the object, the present invention includes: a power converter to convert AC power supplied for charging a storage battery to DC power, and convert DC power discharged from the storage battery to AC power; and a first power detector to detect AC power supplied from a commercial system and detect AC power to be supplied to the commercial system. The present invention further includes: a second power detector to detect AC power supplied from a solar power generation system that generates power using solar light; a third power detector to detect AC power supplied from the power converter and detect AC power to be supplied to the power converter; and a fourth power detector to detect AC power to be supplied to an electric load that consumes power. The present invention further includes a storage unit to store therein load power value data indicating a load power value that is a power value detected by the fourth power detector, estimated local solar-radiation data indicating estimation of solar radiation in a local area including a location where the solar power generation system is installed, operational mode data indicating an operational mode that identifies a power utilization method, price data indicating a price of AC power to be supplied from the commercial system and a price of AC power to be supplied to the commercial system, power conversion efficiency data indicating power conversion efficiency of the power converter at a time of charging or discharging the storage battery, and current time data indicating a current time. The present invention further includes a selection unit to acquire estimated load power data indicating estimation of power to be consumed by the electric load on a basis of the load power value data stored in the storage unit, to acquire estimated solar power-generation power data indicating estimation of power to be generated by the solar power generation system on a basis of the estimated local solar-radiation data stored in the storage unit, and to select one of a plurality of specific operations regarding usage of power on a basis of the estimated load power data acquired and the estimated solar power-generation power data acquired, and on a basis of the operational mode data, the price data, the power conversion efficiency data, and the current time data that are stored in the storage unit. The present invention further includes a control unit to control operation of the power converter on a basis of power values detected respectively by the first power detector, the second power detector, and the third power detector, and on a basis of an operation selection result that is a result of selection made by the selection unit.

Advantageous Effects of Invention

The present invention has an effect where it is possible to control charging and discharging of a storage battery by taking into account both economic efficiency and environmental friendliness.

DESCRIPTION OF EMBODIMENTS

A charging-discharging device, a charging-discharging system, and a charging-discharging control method according to an embodiment of the present invention will be described in detail below with reference to the accompanying drawings. The present invention is not limited to the embodiments.

Embodiment

Figure 1:
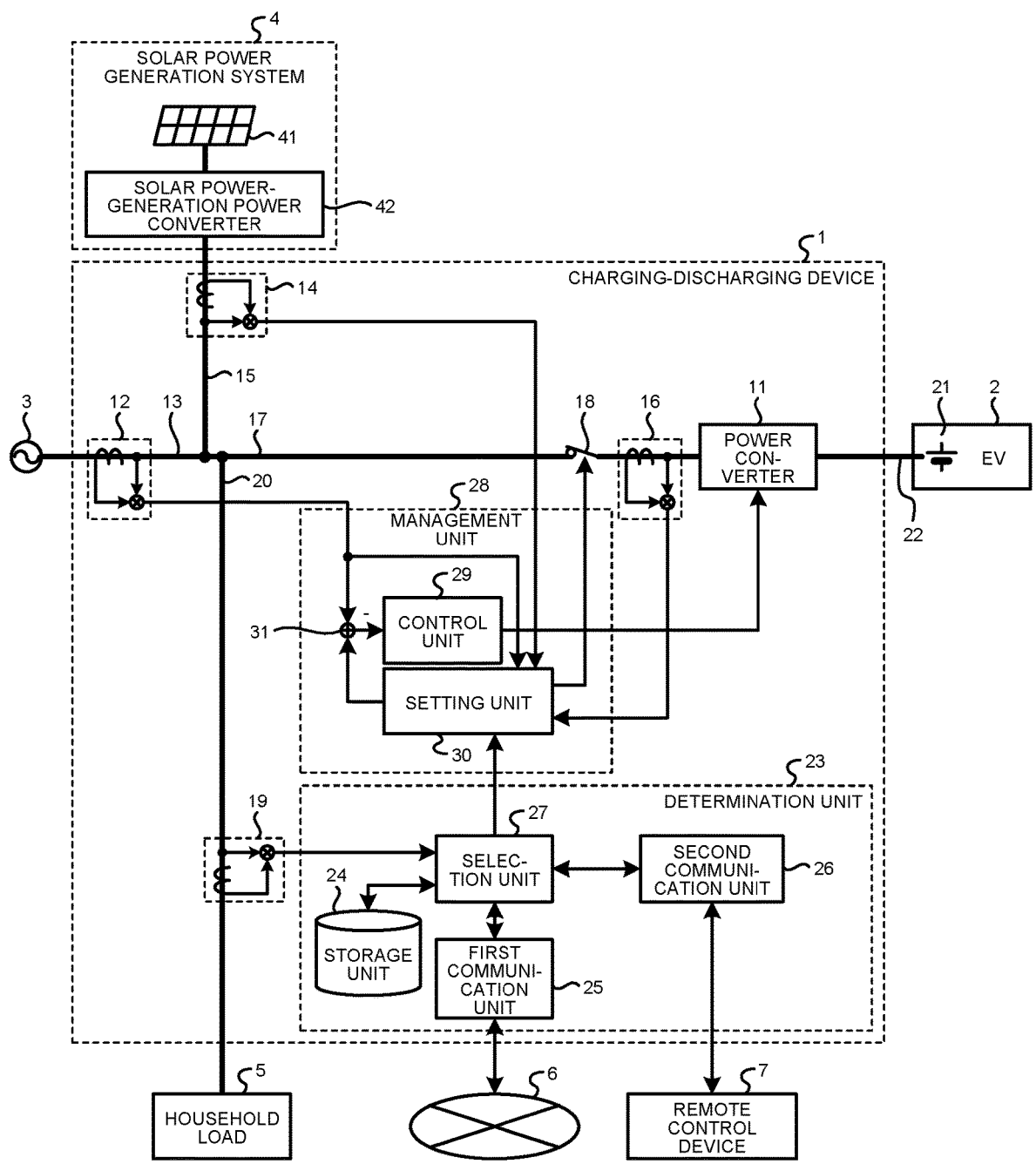
FIG. 1 is a diagram illustrating a configuration of a charging-discharging device according to an embodiment.

FIG. 1 is a diagram illustrating a configuration of a charging-discharging device 1 according to an embodiment. The charging-discharging device 1 is connected to an EV 2, a commercial system 3 that is a power system to supply power from a power supplier, a solar power generation system 4 that generates power using solar light, a household load 5 that is an electric load in a house, the Internet 6, and a remote control device 7 that is used by a user. The user is a person who uses the charging-discharging device 1. FIG. 1 also illustrates the EV 2, the commercial system 3, the solar power generation system 4, the household load 5, the Internet 6, and the remote control device 7. Assuming that a broadband router and other devices, which are necessary for connection to the Internet in general, are included in the Internet 6, detailed descriptions of these devices are omitted. In the present embodiment, the electric load is the household load 5, however, the electric load may be installed in buildings and factories. In view of this, instead of the household load 5, it is also allowable to use an electric load that consumes power in a building or factory.

The EV 2 has a storage battery 21 installed therein. The storage battery 21 is a DC power supply to drive constituent elements of the EV 2. The charging-discharging device 1 is connected to the storage battery 21 through a connector cable 22. The charging-discharging device 1 controls charging and discharging of the storage battery 21. It is allowable that the EV 2 is replaced with an automobile having the storage battery 21 installed therein. The automobile having the storage battery 21 installed therein is, for example, a plug-in hybrid vehicle or a plug-in hybrid EV.

The solar power generation system 4 includes a solar cell array 41 that generates power using solar light, and a solar power-generation power converter 42 that converts DC power generated by the solar cell array 41 to AC power. The solar power-generation power converter 42 is a power conditioner. The solar power-generation power converter 42 is connected to the solar cell array 41. The charging-discharging device 1 is connected to the solar power-generation power converter 42. AC power output from the solar power-generation power converter 42 to the charging-discharging device 1 is supplied to at least one of the commercial system 3, the storage battery 21, and the household load 5 that are connected to the charging-discharging device 1. Examples of the household load 5 include a refrigerator, a lighting device, a cooking appliance, a telephone, a television set, and an audio device.

The remote control device 7 receives a command from a user and transmits the command to the charging-discharging device 1. The charging-discharging device 1 has a function of managing an operational state of the charging-discharging device 1, the residual amount of power stored in the storage battery 21, and a connection state of the charging-discharging device 1 and the EV 2. The charging-discharging device 1 has a function of transmitting to the remote control device 7 operational state information indicating the operational state of the charging-discharging device 1, battery residual amount information indicating the residual amount of power stored in the storage battery 21, and vehicle connection state information indicating the connection state of the charging-discharging device 1 and the EV 2.

The remote control device 7 receives the operational state information, the battery residual amount information, and the vehicle connection state information that are transmitted from the charging-discharging device 1. The remote control device 7 includes a display device (not illustrated), and displays the received information on the display device, the received information including the operational state information, the battery residual amount information, and the vehicle connection state information. The display device is, for example, a liquid-crystal display device. The remote control device 7 also includes a time detection unit that detects the current time. The time detection unit is not illustrated in FIG. 1.

The charging-discharging device 1 cooperates with the solar power generation system 4, and is set to any one of the operational modes including a first operational mode, a second operational mode, and a third operational mode. The first operational mode is defined as an "economy mode". In the economy mode, when the amount of AC power generated by the solar power generation system 4 is greater than the amount of AC power consumed by the household load 5, that is, when there is a surplus of power, a surplus-power selling operation is performed to sell the power to the commercial system 3. Further, in the economy mode, when the amount of AC power generated by the solar power generation system 4 is less than the amount of AC power consumed by the household load 5, that is, when there is a power shortage, a power-shortage discharging operation is performed to discharge the storage battery 21 to supply power stored in the storage battery 21 to the household load 5.

The second operational mode is defined as a "green mode". In the green mode, when the amount of AC power generated by the solar power generation system 4 is greater than the amount of AC power consumed by the household load 5, that is, when there is a surplus of power, a surplus-power charging operation is performed to charge the storage battery 21. Further, in the green mode, when the amount of AC power generated by the solar power generation system 4 is less than the amount of AC power consumed by the household load 5, the power-shortage discharging operation described above is performed.

The third operational mode is defined as a mode in which either the first operational mode or the second operational mode, whichever is more economically efficient, is selected.

Due to the economy mode or the green mode, the amount of power stored in the storage battery 21 is decreased. A user purchases power from the commercial system 3 in the night-time period during which the electricity rate is relatively low, so that the purchased power is replenished to the storage battery 21 through the charging-discharging device 1.

The charging-discharging device 1 includes a power converter 11 that converts AC power supplied for charging the storage battery 21 to DC power, and converts DC power discharged from the storage battery 21 to AC power. The power converter 11 is connected to the storage battery 21 through the connector cable 22. The charging-discharging device 1 further includes a first power detector 12 that detects AC power supplied from the commercial system 3 at the time of purchasing power, and detects AC power to be supplied to the commercial system 3 at the time of selling power.

The charging-discharging device 1 further includes a first power path 13 through which AC power flows from the commercial system 3 to be supplied to the household load 5 and the power converter 11, and through which AC power flows from the solar power-generation power converter 42 to be supplied to the commercial system 3. The first power detector 12 is located on the first power path 13 to detect AC power flowing through the first power path 13.

The charging-discharging device 1 further includes a second power detector 14 that detects AC power supplied from the solar power generation system 4. The charging-discharging device 1 further includes a second power path 15 through which AC power flows from the solar power-generation power converter 42, included in the solar power generation system 4, to be supplied to at least one of the commercial system 3, the household load 5, and the power converter 11. The second power detector 14 is located on the second power path 15 to detect AC power flowing through the second power path 15. The second power path 15 is connected to the first power path 13.

The charging-discharging device 1 further includes a third power detector 16 that detects AC power supplied from the power converter 11, and detects AC power to be supplied to the power converter 11. The charging-discharging device 1 further includes a third power path 17 through which AC power flows from the commercial system 3 or the solar power-generation power converter 42 to be supplied to the power converter 11, and through which AC power flows from the power converter 11 to be supplied to the household load 5. The third power detector 16 is located on the third power path 17. The third power path 17 is connected to the first power path 13. The charging-discharging device 1 further includes a switching device 18 located on the third power path 17 to open/close the third power path 17.

The charging-discharging device 1 further includes a fourth power detector 19 that detects AC power to be supplied to the household load 5. The charging-discharging device 1 further includes a fourth power path 20 through which AC power flows from the commercial system 3, the solar power-generation power converter 42, and the power converter 11 to be supplied to the household load 5. The fourth power detector 19 is located on the fourth power path 20. The fourth power path 20 is connected to the third power path 17.

The charging-discharging device 1 further includes a determination unit 23 including a storage unit 24 that stores therein load power value data indicating a load power value that is a power value detected by the fourth power detector 19, and estimated local solar-radiation data indicating estimation of solar radiation in a local area including the location where the solar power generation system 4 is installed. The storage unit 24 is, for example, a semiconductor memory. The storage unit 24 further stores therein operational mode data indicating an operational mode that identifies the power utilization method, and price data indicating the price of AC power to be supplied from the commercial system 3 and the price of AC power to be supplied to the commercial system 3. The storage unit 24 further stores therein power conversion efficiency data indicating power conversion efficiency of the power converter 11 at the time of charging or discharging the storage battery 21, and current time data indicating the current time.

The determination unit 23 further includes a first communication unit 25 that receives estimated local solar-radiation data distributed via the Internet 6. The estimated local solar-radiation data varies from time to time. It is preferable that the first communication unit 25 receives the latest estimated local solar-radiation data.

A user inputs the operational mode data, the price data, the power conversion efficiency data, and the current time data to the remote control device 7. The remote control device 7 transmits to the charging-discharging device 1 the input data that is the operational mode data, the price data, the power conversion efficiency data, and the current time data. The determination unit 23 further includes a second communication unit 26 that receives the operational mode data, the price data, the power conversion efficiency data, and the current time data that are transmitted from the remote control device 7. The second communication unit 26 also has a function of transmitting to the remote control device 7 the operational state information, the battery residual amount information, and the vehicle connection state information that are described above.

The fourth power detector 19 outputs the load power value data to the determination unit 23. The determination unit 23 further includes a selection unit 27 that receives the load power value data output from the fourth power detector 19 and stores the load power value data in the storage unit 24. The first communication unit 25 outputs the estimated local solar-radiation data to the selection unit 27. The selection unit 27 receives the estimated local solar-radiation data output from the first communication unit 25 and stores the estimated local solar-radiation data in the storage unit 24.

The second communication unit 26 outputs the operational mode data, the price data, the power conversion efficiency data, and the current time data to the selection unit 27. The selection unit 27 receives the operational mode data, the price data, the power conversion efficiency data, and the current time data that are output from the second communication unit 26, and stores the operational mode data, the price data, the power conversion efficiency data, and the current time data in the storage unit 24.

The selection unit 27 acquires estimated load power data indicating estimation of power to be consumed by the household load 5 on the basis of the load power value data stored in the storage unit 24. For example, the selection unit 27 acquires estimated load power data for a predetermined period of time on the basis of the past load power value data by day of the week stored in the storage unit 24. Specifically, on the basis of the past load power value data by day of the week, the selection unit 27 acquires the user's past life pattern by day of the week. On the basis of the acquired life pattern, the selection unit 27 acquires the estimated solar power-generation power data, for example, per 30 minutes from the current time to a time after a predetermined period of time. The predetermined period of time is, for example, 24 hours.

The selection unit 27 acquires estimated solar power-generation power data indicating estimation of power to be generated by the solar power generation system 4 on the basis of the estimated local solar-radiation data stored in the storage unit 24. For example, on the basis of the estimated local solar-radiation data, the selection unit 27 acquires the estimated solar power-generation power data indicating estimation of power to be generated by the solar power generation system 4 from the current time to a time after a predetermined period of time. The predetermined period of time is, for example, 24 hours.

It is assumed that the estimated local solar-radiation data distributed via the Internet 6 indicates estimation of solar radiation in a local area including the location where the solar power generation system 4 is installed per 30 minutes from the current time to a time after 24 hours. In addition, it is assumed that the storage unit 24 further stores therein solar cell data indicating an output rating and power generation efficiency of the solar cell array 41, and installation conditions of the solar cell array 41 as well as an output rating, power conversion efficiency, and actual values of power generation of the solar power-generation power converter 42. Examples of the installation conditions include the angle and orientation of the roof on which the solar cell array 41 is installed.

Under the above assumption, the selection unit 27 acquires the estimated solar power-generation power data per 30 minutes from the current time to a time after 24 hours, for example, on the basis of the estimated local solar-radiation data and the solar cell data that are stored in the storage unit 24. It is allowable that the estimated load power data and the estimated solar power-generation power data are acquired using artificial intelligence.

On the basis of the estimated load power data acquired and the estimated solar power-generation power data acquired, and on the basis of the operational mode data, the price data, the power conversion efficiency data, and the current time data that are stored in the storage unit 24, the selection unit 27 selects one of a plurality of specific operations regarding usage of power.

Examples of the specific operations described above include a surplus-power selling operation, a surplus-power charging operation, a power-shortage discharging operation, and a forcible charging operation. The surplus-power selling operation refers to an operation to sell power to the commercial system 3 when the amount of AC power generated by the solar power generation system 4 is greater than the amount of AC power consumed by the household load 5, that is, when there is a surplus of power. The surplus-power charging operation refers to an operation to charge the storage battery 21 when the amount of AC power generated by the solar power generation system 4 is greater than the amount of AC power consumed by the household load 5, that is, when there is a surplus of power.

The power-shortage discharging operation refers to an operation to discharge the storage battery 21 to supply power stored in the storage battery 21 to the household load 5 when the amount of AC power generated by the solar power generation system 4 is less than the amount of AC power consumed by the household load 5, that is, when there is a power shortage. The forcible charging operation refers to an operation to charge the storage battery 21 using AC power generated by the solar power generation system 4 regardless of the amount of AC power consumed by the household load 5.

When the operational mode data stored in the storage unit 24 indicates that the operational mode is the third operational mode, the selection unit 27 creates estimated surplus/shortage power data indicating an estimated value obtained by subtracting the value of AC power to be generated by the solar power generation system 4 from the value of AC power to be consumed by the household load 5 on the basis of the estimated load power data and the estimated solar power-generation power data.

On the basis of the estimated surplus/shortage power data created, and on the basis of the price data and the power conversion efficiency data that are stored in the storage unit 24, the selection unit 27 calculates a first economic value indicating economic efficiency when the operation is performed in the first operational mode for a predetermined period of time, and calculates a second economic value indicating economic efficiency when the operation is performed in the second operational mode for the predetermined period of time. The selection unit 27 compares the first economic value and the second economic value to each other to select a specific operation in either the first operational mode or the second operational mode, whichever is more economically efficient.

The charging-discharging device 1 further includes a management unit 28 including a control unit 29 that controls operation of the power converter 11 on the basis of power values detected respectively by the first power detector 12, the second power detector 14, and the third power detector 16, and on the basis of an operation selection result that is a result of the selection made by the selection unit 27.

Each of the first power detector 12, the second power detector 14, and the third power detector 16 outputs data indicating a voltage of the detected AC power to the management unit 28. The management unit 28 further includes a setting unit 30 that receives data output from each of the first power detector 12, the second power detector 14, and the third power detector 16. The selection unit 27 outputs an operation selection result to the setting unit 30, while the setting unit 30 receives the operation selection result output from the selection unit 27.

The setting unit 30 calculates a power-purchase power command value that is a target value of the power amount to be purchased from the commercial system 3 by a user on the basis of power values detected respectively by the first power detector 12, the second power detector 14, and the third power detector 16, and on the basis of an operation selection result that is a result of the selection made by the selection unit 27. The setting unit 30 controls opening/closing of the switching device 18 on the basis of the operation selection result.

The management unit 28 further includes a difference calculator 31 that acquires a difference between the power-purchase power command value calculated by the setting unit 30 and a power value detected by the first power detector 12 at the time of purchasing power. The difference calculator 31 outputs data indicating the acquired difference to the control unit 29, while the control unit 29 receives the data output from the difference calculator 31. The control unit 29 calculates a target charging-discharging power command value that is a target value of the power amount to be charged to or discharged from the storage battery 21 such that the difference acquired by the difference calculator 31 becomes zero.

The control unit 29 outputs the calculated target charging-discharging power command value to the power converter 11. The control unit 29 controls operation of the power converter 11 by outputting the target charging-discharging power command value to the power converter 11. That is, the power converter 11 operates in accordance with the target charging-discharging power command value output from the control unit 29.

More specifically, the power converter 11 converts AC power, supplied from the commercial system 3 or the solar power-generation power converter 42, to DC power in order to charge the storage battery 21 on the basis of the target charging-discharging power command value, and outputs the DC power obtained by the conversion to the storage battery 21. The power converter 11 converts DC power, discharged from the storage battery 21 on the basis of the target charging-discharging power command value, to AC power and outputs the AC power obtained by the conversion to the household load 5. That is, the control unit 29 controls charging and discharging of the storage battery 21 by controlling operation of the power converter 11.

Figure 2:
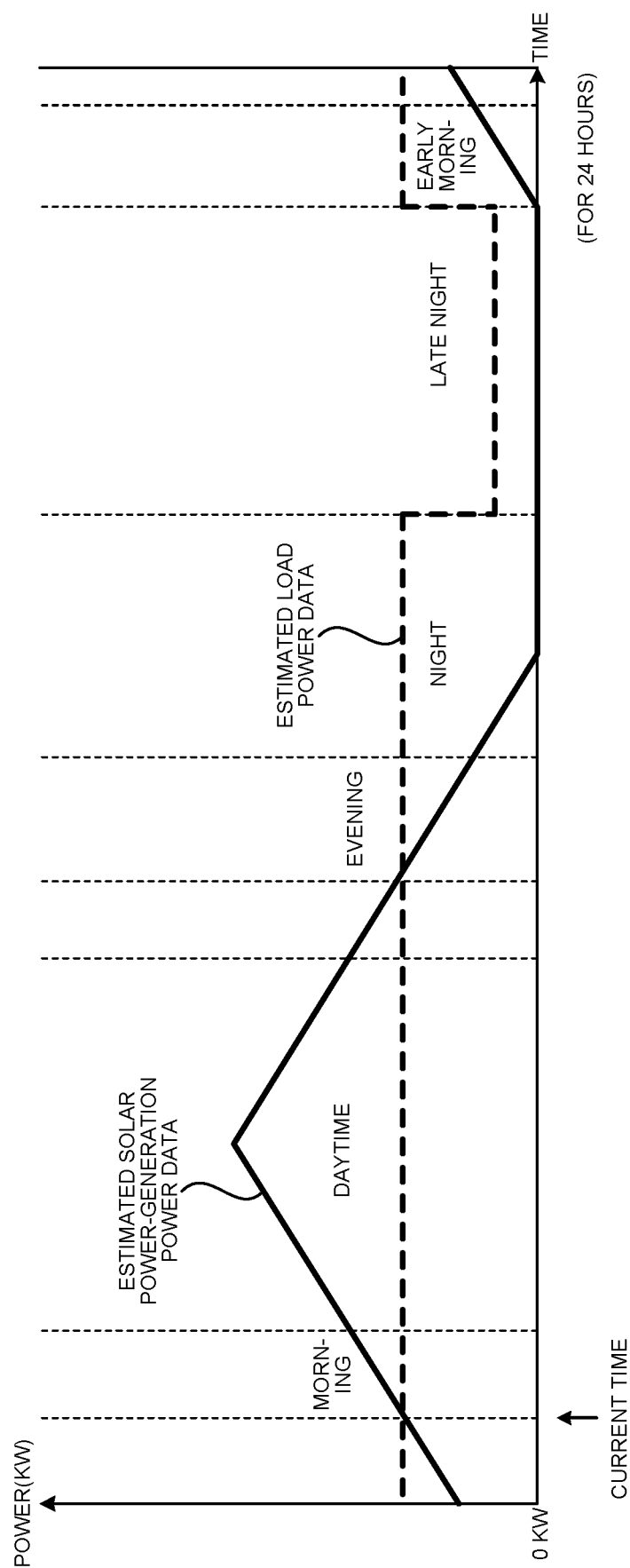
FIG. 2 is a graph illustrating an example of estimated load power data and estimated solar power-generation power data which are acquired by a selection unit included in the charging-discharging device according to the embodiment.

Next, description is made on operation of the charging-discharging device 1 when the charging-discharging device 1 operates in each of the first operational mode, the second operational mode, and the third operational mode. FIG. 2 is a graph illustrating an example of the estimated load power data and the estimated solar power-generation power data which are acquired by the selection unit 27 included in the charging-discharging device 1 according to the present embodiment. The horizontal axis in FIG. 2 represents time including the current time to a time after 24 hours. The vertical axis in FIG. 2 represents power. The power is represented in KW. The estimated load power data is illustrated by the dotted line, while the estimated solar power-generation power data is illustrated by the solid line. More specifically, FIG. 2 illustrates how the estimated load power data and the estimated solar power-generation power data vary in the morning, daytime, evening, night, late night, and early morning.

Figure 3:
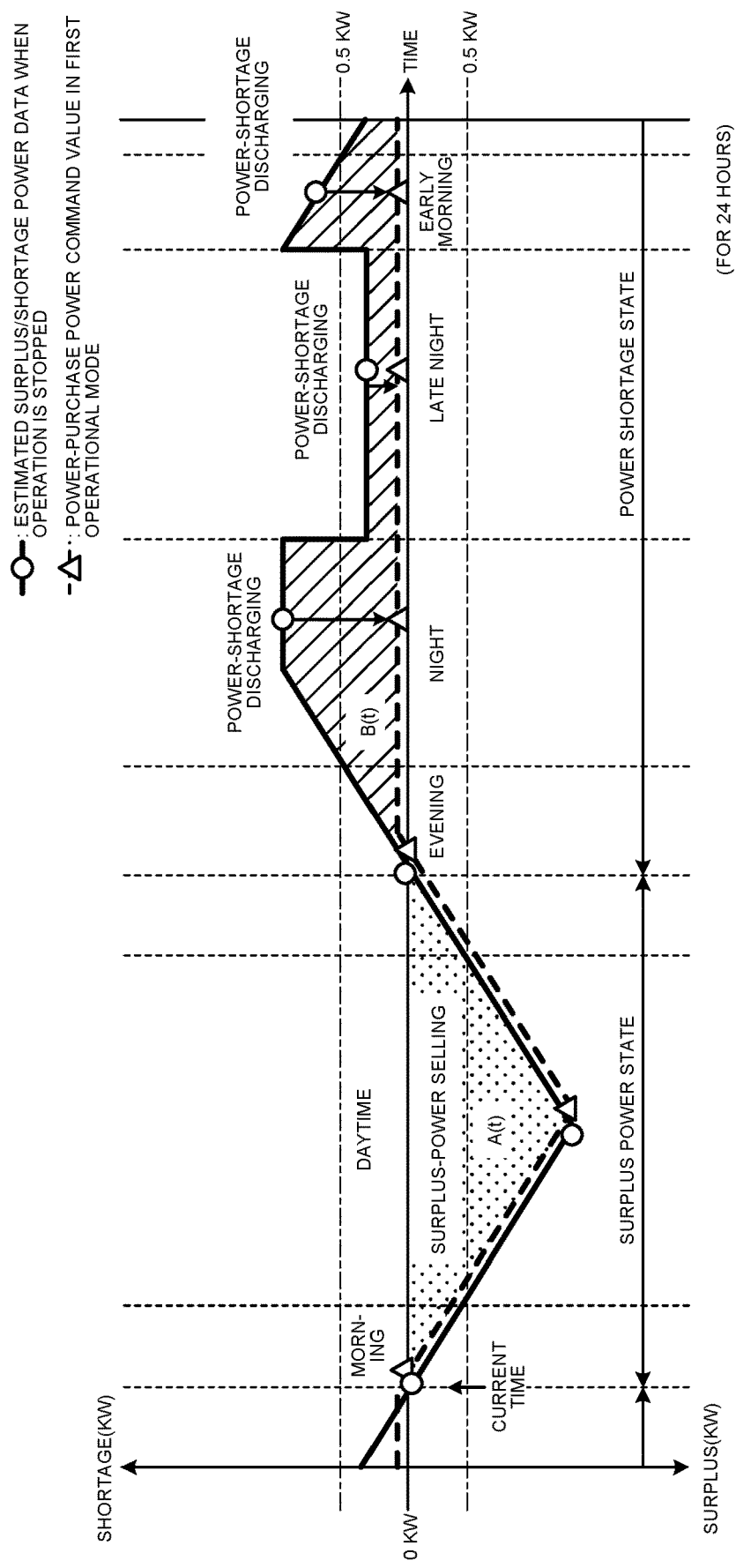
FIG. 3 is an explanatory graph illustrating an example of operation of the charging-discharging device according to the embodiment when the operational mode is a first operational mode.

FIG. 3 is an explanatory graph illustrating an example of the operation of the charging-discharging device 1 according to the present embodiment when the operational mode is the first operational mode. The first operational mode is the economy mode. The horizontal axis in FIG. 3 represents time including the current time to a time after 24 hours. The vertical axis in FIG. 3 represents an estimated value of surplus power and power shortage for the household load 5. The estimated value of surplus power and power shortage is represented in KW.

The estimated value above 0 on the vertical axis represents a power shortage for the household load 5, while the estimated value below 0 on the vertical axis represents a surplus power for the household load 5. A combination of the solid line and circles illustrates the estimated surplus/shortage power data of the household load 5 when operation of the charging-discharging device 1 is stopped. The estimated surplus/shortage power data is calculated by subtracting the estimated load power data from the estimated solar power-generation power data. A combination of the dotted line and triangles illustrates the power-purchase power command value in the first operational mode.

In the first operational mode, when the selection unit 27 determines on the basis of the estimated surplus/shortage power data that the household load 5 is in a surplus power state with a surplus power value A(t) (KW) in the morning and daytime, for example, as illustrated in FIG. 3, then the selection unit 27 outputs an operation selection result indicating the surplus-power selling operation to the setting unit 30. The control unit 29 opens the switching device 18 on the basis of the operation selection result, and performs the surplus-power selling operation in which the storage battery 21 is not charged or discharged.

When the selection unit 27 determines that the household load 5 is in a power shortage state with a power shortage value B(t) (KW) in the evening and afterwards, then the selection unit 27 outputs an operation selection result indicating the power-shortage discharging operation to the setting unit 30. On the basis of the operation selection result, the control unit 29 closes the switching device 18, and performs the power-shortage discharging operation to discharge power from the storage battery 21 by controlling the power converter 11 such that the power shortage for the household load 5 shifts from the position of the combination of the solid line and circles to the position of the combination of the dotted line and triangles.

When the selection unit 27 determines that the current time indicated by the current time data stored in the storage unit 24 is included in the night-time period during which the electricity rate is relatively low, then the selection unit 27 outputs an operation selection result indicating the forcible charging operation to the setting unit 30 regardless of the first operational mode. On the basis of the operation selection result, the control unit 29 closes the switching device 18 and controls the power converter 11 to perform the forcible charging operation to charge the storage battery 21.

When the value of surplus power or power shortage for the household load 5 is close to 0 KW, the power conversion efficiency of the power converter 11 at the time of charging or discharging the storage battery 21 is reduced. "When the value of surplus power or power shortage for the household load 5 is close to 0 KW" refers to, for example, a case when the value of surplus power for the household load 5 is below 0.5 KW, or a case when the value of power shortage for the household load 5 is below 0.5 KW.

Figure 4:
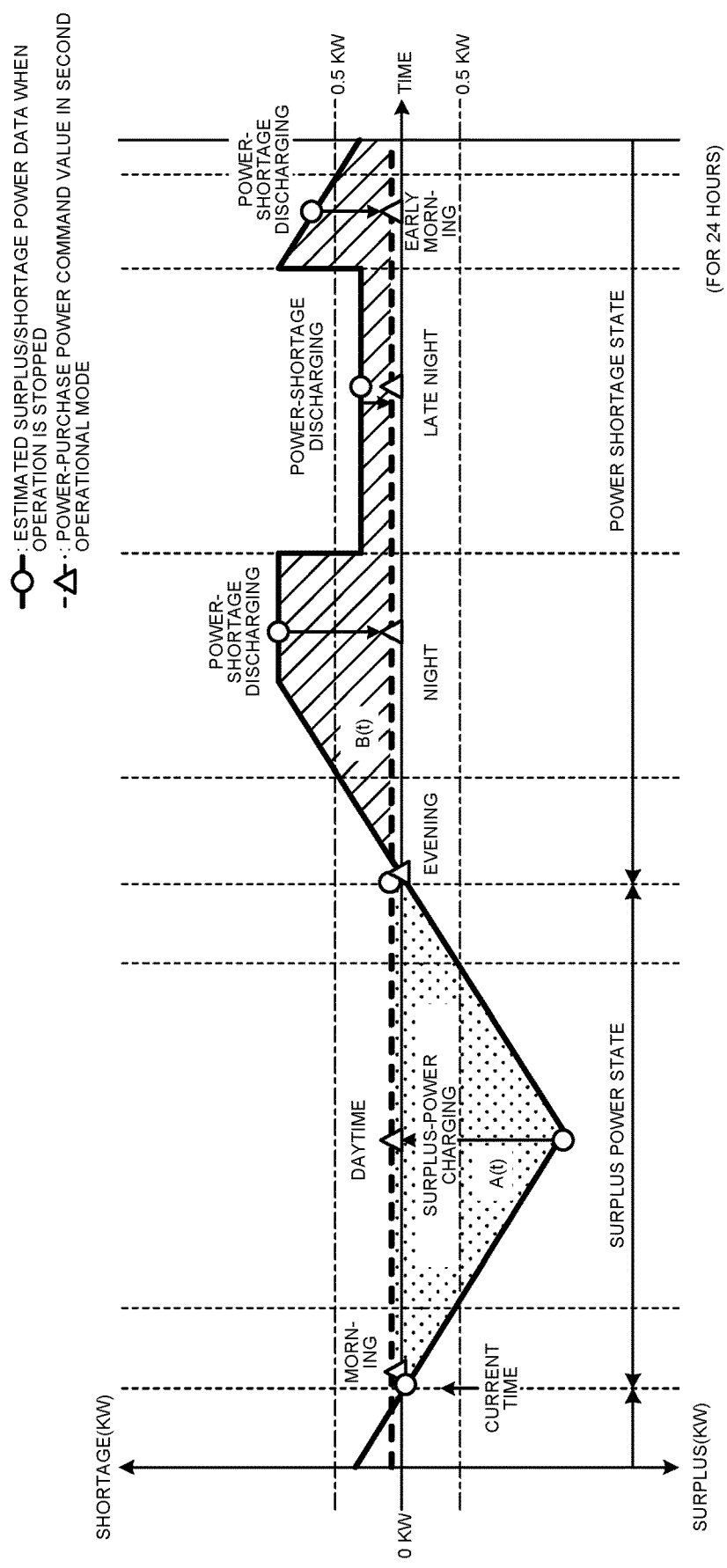
FIG. 4 is an explanatory graph illustrating an example of operation of the charging-discharging device according to the embodiment when the operational mode is a second operational mode.

FIG. 4 is an explanatory graph illustrating an example of the operation of the charging-discharging device 1 according to the present embodiment when the operational mode is the second operational mode. The second operational mode is the green mode. The horizontal axis in FIG. 4 represents time including the current time to a time after 24 hours. The vertical axis in FIG. 4 represents an estimated value of surplus power and power shortage for the household load 5. The estimated value of surplus power and power shortage is represented in KW.

The estimated value above 0 on the vertical axis represents a power shortage for the household load 5, while the estimated value below 0 on the vertical axis represents a surplus power for the household load 5. A combination of the solid line and circles illustrates the estimated surplus/shortage power data of the household load 5 when operation of the charging-discharging device 1 is stopped. The estimated surplus/shortage power data is calculated by subtracting the estimated load power data from the estimated solar power-generation power data. A combination of the dotted line and triangles illustrates the power-purchase power command value in the second operational mode.

In the second operational mode, when the selection unit 27 determines on the basis of the estimated surplus/shortage power data that the household load 5 is in a surplus power state with a surplus power value A(t) (KW) in the morning and daytime, for example, as illustrated in FIG. 4, then the selection unit 27 outputs an operation selection result indicating the surplus-power charging operation to the setting unit 30. On the basis of the operation selection result, the control unit 29 closes the switching device 18 and controls the power converter 11 to perform the surplus-power charging operation to charge the storage battery 21.

When the selection unit 27 determines that the household load 5 is in a power shortage state with a power shortage value B(t) (KW) in the evening and afterwards, then the selection unit 27 outputs an operation selection result indicating the power-shortage discharging operation to the setting unit 30. On the basis of the operation selection result, the control unit 29 closes the switching device 18, and performs the power-shortage discharging operation to discharge power from the storage battery 21 by controlling the power converter 11 such that the power shortage for the household load 5 shifts from the position of the combination of the solid line and circles to the position of the combination of the dotted line and triangles.

Figure 5:
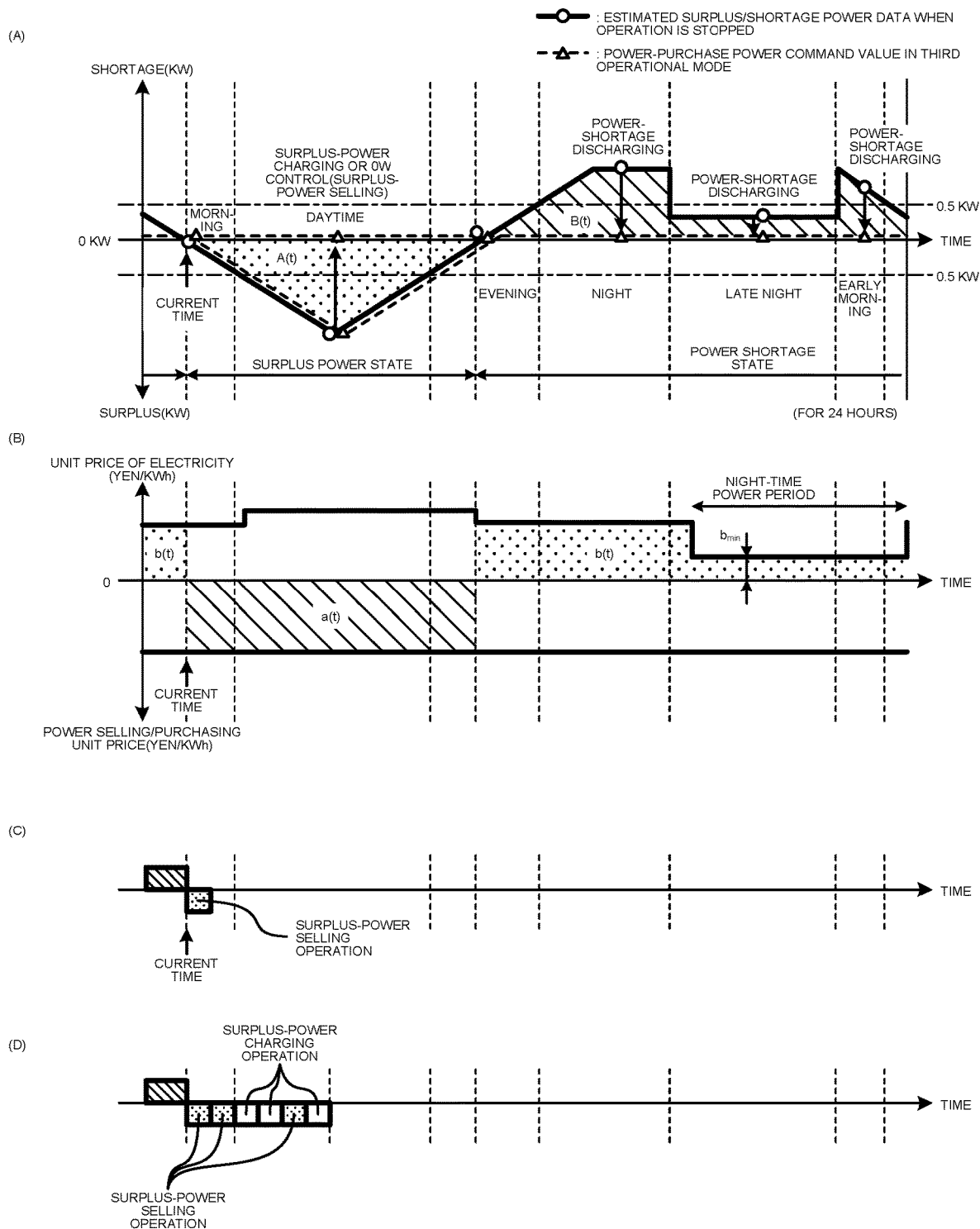
FIG. 5 are explanatory graphs illustrating an example of operation of the charging-discharging device according to the embodiment when the operational mode is a third operational mode.

FIG. 5 are explanatory graphs illustrating an example of the operation of the charging-discharging device 1 according to the present embodiment when the operational mode is the third operational mode. The third operational mode refers to a mode in which either the first operational mode or the second operational mode, whichever is more economically efficient, is selected. The horizontal axis in FIG. 5(A) represents time including the current time to a time after 24 hours. The vertical axis in FIG. 5(A) represents an estimated value of surplus power and power shortage for the household load 5. The estimated value of surplus power and power shortage is represented in KW.

In FIG. 5(A), the estimated value above 0 on the vertical axis represents a power shortage for the household load 5, while the estimated value below 0 on the vertical axis represents a surplus power for the household load 5. A combination of the solid line and circles illustrates the estimated surplus/shortage power data of the household load 5 when operation of the charging-discharging device 1 is stopped. The estimated surplus/shortage power data is calculated by subtracting the estimated load power data from the estimated solar power-generation power data. A combination of the dotted line and triangles illustrates the power-purchase power command value in the third operational mode.

In the third operational mode, when the selection unit 27 determines on the basis of the estimated surplus/shortage power data that the household load 5 is in a surplus power state with a surplus power value A(t) (KW) in the morning and daytime, for example, as illustrated in FIG. 5(A), then the selection unit 27 outputs an operation selection result indicating the surplus-power selling operation or the surplus-power charging operation to the setting unit 30. On the basis of the operation selection result, the control unit 29 controls the switching device 18 and the power converter 11 to perform the surplus-power selling operation or the surplus-power charging operation.

When the selection unit 27 determines that the household load 5 is in a power shortage state with a power shortage value B(t) (KW) in the evening and afterwards, then the selection unit 27 outputs an operation selection result indicating the power-shortage discharging operation to the setting unit 30. On the basis of the operation selection result, the control unit 29 closes the switching device 18, and performs the power-shortage discharging operation to discharge power from the storage battery 21 by controlling the power converter 11 such that the power shortage for the household load 5 shifts from the position of the combination of the solid line and circles to the position of the combination of the dotted line and triangles.

In the present embodiment, regardless of the operational mode, the selection unit 27 determines the power state of the household load 5, for example, per 30 minutes, outputs an operation selection result corresponding to the determination result to the setting unit 30, and updates the operation selection result.

Next, description is made on a method for selecting a specific operation when the operational mode is the third operational mode and the household load 5 is in a surplus power state with a surplus power value A(t) (KW).

In FIG. 5(B), the value above 0 on the vertical axis represents the unit price of electricity at the time of purchasing power, while the value below 0 on the vertical axis represents the power selling/purchasing unit price. The unit price of electricity at the time of purchasing power and the power selling/purchasing unit price are represented in yen/KWh. As illustrated in FIG. 5(B), the power selling/purchasing unit price is represented as "a(t)" (yen/KWh), while the hourly unit price of electricity at the time of purchasing power is represented as "b(t)" (yen/KWh), and the electricity rate during the night-time, which is the lowest rate of the day, is represented as $b_{min}$. The power conversion efficiency of the power converter 11 when the charging-discharging device 1 performs the surplus-power charging operation is represented as "η charge (t)". The power conversion efficiency of the power converter 11 when the charging-discharging device 1 performs the power-shortage discharging operation is represented as "η discharge (t)".

For example, when the estimated surplus/shortage power data shows a value below 0.5 KW, the power conversion efficiency of the power converter 11 is assumed to be 50%. When the estimated surplus/shortage power data shows a value equal to or greater than 0.5 KW, the power conversion efficiency of the power converter 11 is assumed to be 90%.

The selection unit 27 calculates a first economic value α indicating economic efficiency when the operation is performed in the first operational mode for 24 hours from the current time on the basis of the following equation (1). The first operational mode is the economy mode.

$$\alpha = \int A(t) \times a(t) dt - \int B(t)/\eta \text{ discharge}(t) dt \times b_{min}(yen) \quad (1)$$

The selection unit 27 calculates a second economic value β indicating economic efficiency when the operation is performed in the second operational mode for 24 hours from the current time on the basis of the following equation (2). The second operational mode is the green mode.

$$\beta = (\int \{A(t) \times \eta \text{ charge}(t) - B(t)/\eta \text{ discharge}(t)\} dt) \times b_{min} \text{ (yen)} \quad (2)$$

However, when the value in the parenthesis { } is smaller than 0, integration is performed, and when the value in the parenthesis { } is equal to or larger than 0, integration is not performed.

The first term of the equation (1) to calculate the first economic value α represents the purchasing price obtained when surplus power for the household load 5 is sold. The second term of the equation (1) represents the electricity rate when the storage battery 21 is replenished with power equal to the decrease in power due to the power-shortage discharging operation by the forcible charging operation. The second economic value β represents the electricity rate when the storage battery 21 is replenished with power equal to the decrease in power due to the power-shortage discharging operation by the forcible charging operation. The storage battery 21 is replenished with power by the forcible charging operation only when the amount of power stored in the storage battery 21 becomes less than a predetermined amount due to the power-shortage discharging operation.

The selection unit 27 compares the first economic value α indicating economic efficiency when the operation is performed in the first operational mode for 24 hours from the current time with the second economic value β indicating economic efficiency when the operation is performed in the second operational mode for 24 hours from the current time. When the first economic value α is greater than the second economic value β, the selection unit 27 selects the surplus-power selling operation, and outputs an operation selection result indicating the surplus-power selling operation to the setting unit 30. When the second economic value β is greater than the first economic value a, the selection unit 27 selects the surplus-power charging operation, and outputs an operation selection result indicating the surplus-power charging operation to the setting unit 30.

For example, the operation selection result is updated at the interval of 30 minutes. For example, as illustrated in FIG. 5(C), the selection unit 27 selects the surplus-power selling operation at the current time. For example, since the selection of the surplus-power selling operation, each time 30 minutes has elapsed, the selection unit 27 selects the surplus-power selling operation, the surplus-power charging operation, again the surplus-power charging operation, then the surplus-power selling operation, and then the surplus-power charging operation in the order as illustrated in FIG. 5(D). The selection unit 27 outputs an operation selection result indicating the selected operation to the setting unit 30.

When the power-shortage discharging operation and the forcible charging operation are performed, the selection unit 27 does not calculate the first economic value α and the second economic value β, because the selection unit 27 does not select the surplus-power selling operation and the surplus-power charging operation.

Figure 6:
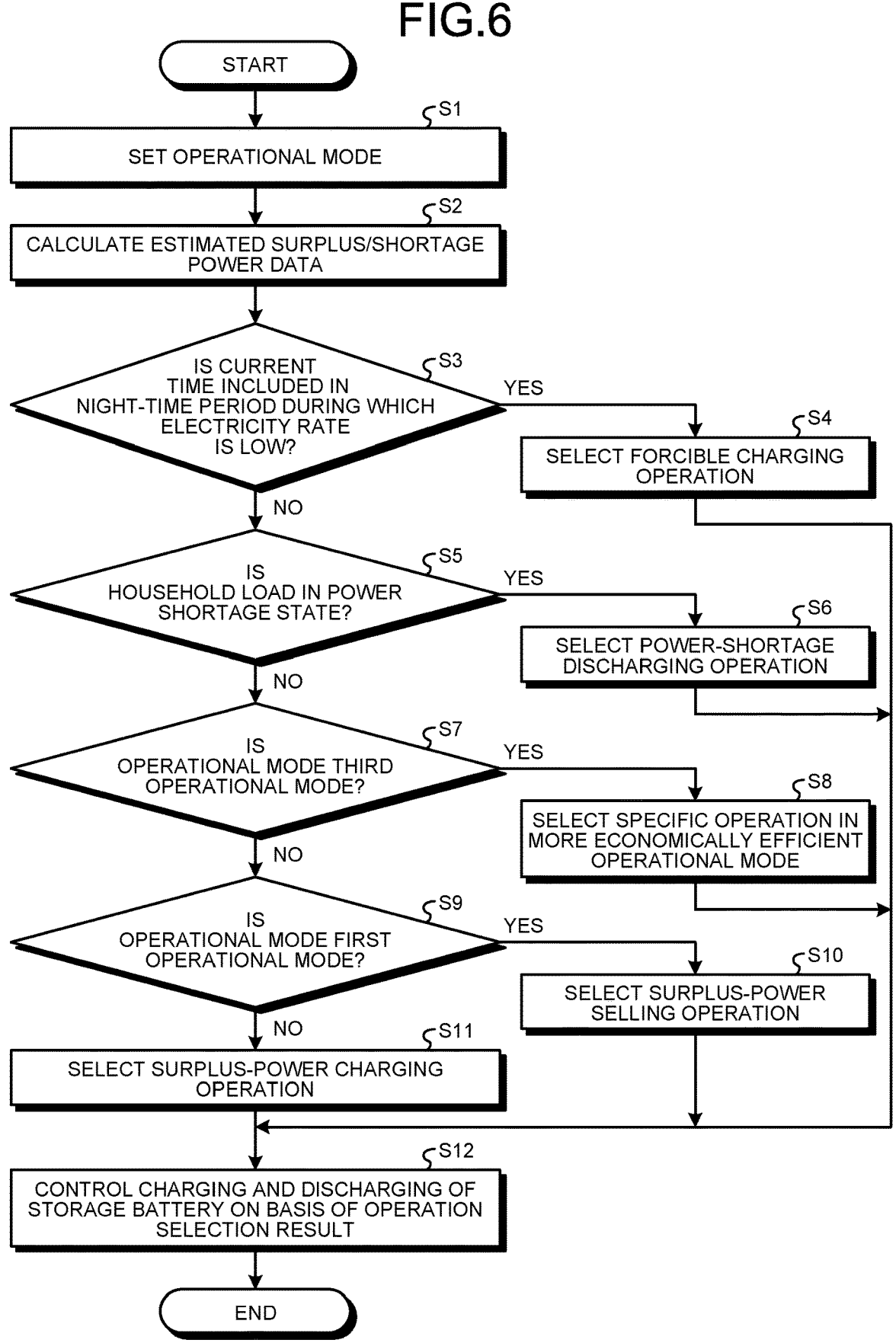
FIG. 6 is a flowchart illustrating a procedure of operation of the charging-discharging device according to the embodiment.

Next, operation of the charging-discharging device 1 is described. FIG. 6 is a flowchart illustrating a procedure of the operation of the charging-discharging device 1 according to the present embodiment. A user inputs an operational mode to the remote control device 7. The remote control device 7 transmits operational mode data indicating the input operational mode to the charging-discharging device 1.

In the charging-discharging device 1, the second communication unit 26 receives the operational mode data transmitted from the remote control device 7, and the storage unit 24 stores therein the operational mode data (S1). At Step S1 in FIG. 6, the storage unit 24 stores therein the operational mode data, which is described as "set operational mode".

The selection unit 27 calculates estimated surplus/shortage power data which is data for 24 hours from the current time on the basis of the operational mode data, the current time data, the estimated solar power-generation power data, and the estimated load power data (S2).

The selection unit 27 determines whether the current time is included in the night-time period during which the electricity rate is relatively low (S3). When the selection unit 27 determines that the current time is included in the night-time period during which the electricity rate is relatively low (YES at S3), the selection unit 27 selects the forcible charging operation (S4). When the selection unit 27 determines that the current time is not included in the night-time period during which the electricity rate is relatively low (NO at S3), the selection unit 27 determines whether the household load 5 is in a power shortage state with a power shortage value B(t) (KW) (S5).

When the selection unit 27 determines that the household load 5 is in a power shortage state with a power shortage value B(t) (KW) (YES at S5), the selection unit 27 selects the power-shortage discharging operation (S6). When the selection unit 27 determines that the household load 5 is not in a power shortage state with a power shortage value B(t) (KW) (NO at S5), the selection unit 27 determines whether the operational mode is the third operational mode (S7).

When the selection unit 27 determines that the operational mode is the third operational mode (YES at S7), the selection unit 27 calculates the first economic value α indicating economic efficiency when the operation is performed in the first operational mode for 24 hours from the current time, and calculates the second economic value β indicating economic efficiency when the operation is performed in the second operational mode for 24 hours from the current time. The first operational mode is the economy mode. The second operational mode is the green mode. The selection unit 27 selects a specific operation in an operational mode with either the first economic value α or the second economic value β, whichever is greater (S8). That is, the selection unit 27 selects a specific operation in a more economically efficient operational mode at Step S8.

When the selection unit 27 determines that the operational mode is not the third operational mode (NO at S7), the selection unit 27 determines whether the operational mode is the first operational mode (S9). When the selection unit 27 determines that the operational mode is the first operational mode (YES at S9), the selection unit 27 selects the surplus-power selling operation (S10). When the selection unit 27 determines that the operational mode is not the first operational mode (NO at S9), the selection unit 27 selects the surplus-power charging operation (S11).

The control unit 29 controls charging and discharging of the storage battery 21 by controlling the power converter 11 on the basis of power values detected respectively by the first power detector 12, the second power detector 14, and the third power detector 16, and on the basis of an operation selection result that is a result of the selection made by the selection unit 27 (S12).

As described above, the charging-discharging device 1 according to the present embodiment selects one of the specific operations on the basis of the price data indicating the price of AC power to be supplied from the commercial system 3 and the price of AC power to be supplied to the commercial system 3, and on the basis of the power conversion efficiency data indicating power conversion efficiency of the power converter 11 at the time of charging or discharging the storage battery 21. On the basis of an operation selection result that is a result of the selection, the charging-discharging device 1 controls operation of the power converter 11.

Since the charging-discharging device 1 controls operation of the power converter 11 on the basis of the price data indicating the price of AC power to be supplied from the commercial system 3 and the price of AC power to be supplied to the commercial system 3, the charging-discharging device 1 can execute the control taking into account the economic efficiency. In a case where the value of surplus power or power shortage for the household load 5 is close to 0 KW, the power conversion efficiency of the power converter 11 at the time of charging or discharging the storage battery 21 is reduced. Accordingly, the amount of power to be purchased from the commercial system 3 is not decreased, and this reduces the environmental friendliness accordingly because the power to be purchased contains a high percentage of fossil fuel-derived power. However, the charging-discharging device 1 controls operation of the power converter 11 on the basis of the power conversion efficiency data indicating power conversion efficiency of the power converter 11 at the time of charging or discharging the storage battery 21. Thus, the charging-discharging device 1 can execute the control taking into account the environmental friendliness. Therefore, the charging-discharging device 1 can control charging and discharging of the storage battery 21 by taking into account both the economic efficiency and the environmental friendliness.

When the operational mode is the third operational mode, the charging-discharging device 1 calculates the first economic value indicating economic efficiency when the operation is performed in the first operational mode for a predetermined period of time, and calculates the second economic value indicating economic efficiency when the operation is performed in the second operational mode for the predetermined period of time. The charging-discharging device 1 compares the first economic value and the second economic value to each other to select a specific operation in either the first operational mode or the second operational mode, whichever is more economically efficient. Therefore, the charging-discharging device 1 can control charging and discharging of the storage battery 21 by taking into account the economic efficiency.

More specifically, the charging-discharging device 1 obtains the estimated local solar-radiation data distributed via the Internet 6 and indicating estimation of solar radiation in a local area including the location where the solar power generation system 4 is installed. The charging-discharging device 1 acquires the estimated solar power-generation power data per 30 minutes from the current time to a time after 24 hours on the basis of the estimated local solar-radiation data acquired and the solar cell data stored in the storage unit 24. Therefore, the charging-discharging device 1 can obtain the estimated solar power-generation power data that is relatively more accurate.

It is allowable that the storage battery 21 is not installed in the EV 2. For example, it is allowable that the storage battery 21 is a stationary storage battery.

It is allowable that the storage unit 24 further stores therein performance data indicating performance of the solar cell array 41. It is allowable that the selection unit 27 acquires the estimated solar power-generation power data from the current time to a time after a predetermined period of time on the basis of the estimated local solar-radiation data and the performance data that are stored in the storage unit 24.

Figure 7:
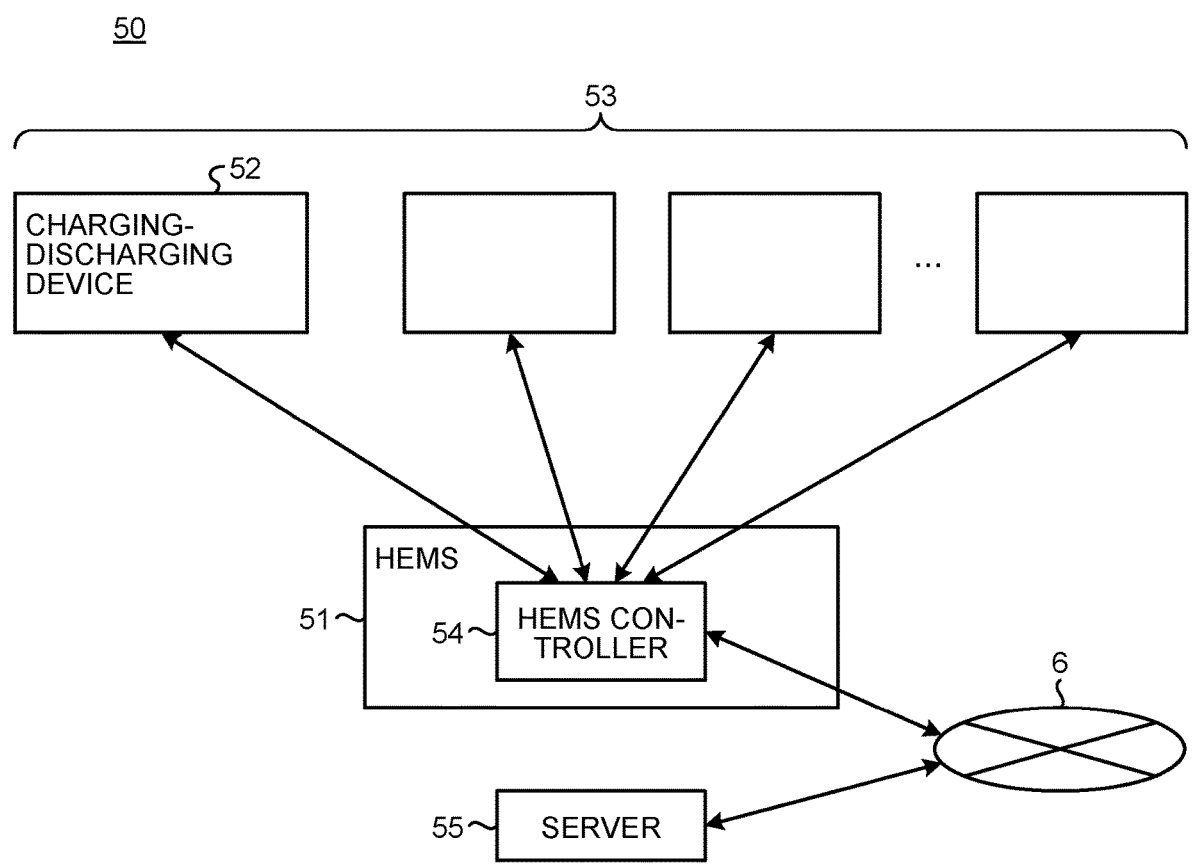
FIG. 7 is a diagram illustrating a configuration of a charging-discharging system according to the embodiment.

In the above embodiment, it is allowable that a part of the operation of the charging-discharging device 1 is performed by another device. In this case, a charging-discharging system is constituted by a plurality of devices including a charging-discharging device. This charging-discharging system performs the above operation of the charging-discharging device 1. As illustrated in FIG. 7, in a case where, for example, a system so-called "Home Energy Management System (HEMS)" 51 that manages power to be used in ordinary households is installed, it is allowable that a charging-discharging system 50 is constituted by the HEMS 51 and a plurality of devices 53 including a charging-discharging device 52, and a HEMS controller 54 is connected to and capable of communicating with the devices 53 including the charging-discharging device 52, and implements some of the functions of respective units such as the storage unit 24, the selection unit 27, and the control unit 29 in the charging-discharging device 1. At this time, it is allowable that a measurement device included in the HEMS 51 is used to serve as each of the power detectors in the charging-discharging device 1. It is further allowable that a server 55 is connected to and capable of communicating with the HEMS controller 54 via the Internet 6, and is added as a constituent element of the charging-discharging system 50, and the server 55 implements some of the functions of the respective units in the charging-discharging device 1.

Figure 8:
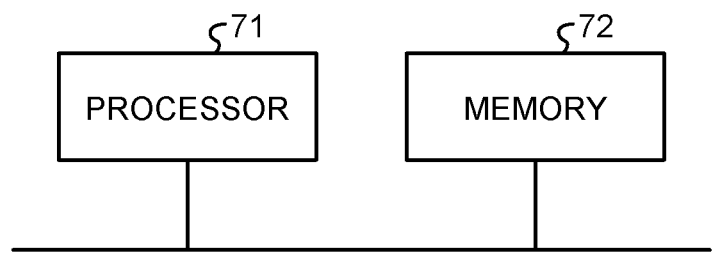
FIG. 8 is a diagram illustrating a processor in a case where at least some of functions of a selection unit, a control unit, a setting unit, and a difference calculator included in the charging-discharging device according to the embodiment are implemented by the processor.

FIG. 8 is a diagram illustrating a processor 71 in a case where at least some of the functions of the selection unit 27, the control unit 29, the setting unit 30, and the difference calculator 31 included in the charging-discharging device 1 according to the present embodiment are implemented by the processor 71. That is, it is allowable that at least some of the functions of the selection unit 27, the control unit 29, the setting unit 30, and the difference calculator 31 are implemented by the processor 71 that executes a program stored in a memory 72. The processor 71 is a Central Processing Unit (CPU), a processing device, an arithmetic device, a microprocessor, or a Digital Signal Processor (DSP). The memory 72 is also illustrated in FIG. 8.

When at least some of the functions of the selection unit 27, the control unit 29, the setting unit 30, and the difference calculator 31 are implemented by the processor 71, the some of the functions are implemented by a combination of the processor 71 and software, firmware or a combination of software and firmware. The software and firmware is described as a program and stored in the memory 72. As the processor 71 reads and executes the program stored in the memory 72, at least some of the functions of the selection unit 27, the control unit 29, the setting unit 30, and the difference calculator 31 are implemented.

In a case where at least some of the functions of the selection unit 27, the control unit 29, the setting unit 30, and the difference calculator 31 are implemented by the processor 71, the charging-discharging device 1 includes the memory 72 for storing a program with which at least some of the steps are consequently executed by the selection unit 27, the control unit 29, the setting unit 30, and the difference calculator 31. It can be also said that the program stored in the memory 72 causes a computer to execute at least a part of the procedure or method to be performed by the selection unit 27, the control unit 29, the setting unit 30, and the difference calculator 31.

The memory 72 is, for example, a nonvolatile or volatile semiconductor memory such as a Random Access Memory (RAM), a Read Only Memory (ROM), a flash memory, an Erasable Programmable Read Only Memory (EPROM), and an Electrically Erasable Programmable Read-Only Memory (EEPROM (registered trademark)); a magnetic disk; a flexible disk; an optical disk; a compact disk; a MiniDisk; a Digital Versatile Disk (DVD) or the like.

Figure 9:
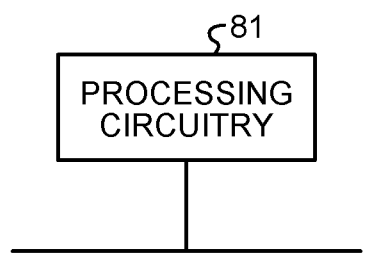
FIG. 9 is a diagram illustrating a processing circuitry in a case where at least some of the selection unit, the control unit, the setting unit, and the difference calculator included in the charging-discharging device according to the embodiment are implemented by the processing circuitry.

FIG. 9 is a diagram illustrating a processing circuitry 81 in a case where at least some of the selection unit 27, the control unit 29, the setting unit 30, and the difference calculator 31 included in the charging-discharging device 1 according to the present embodiment are implemented by the processing circuitry 81. That is, it is allowable that at least some of the selection unit 27, the control unit 29, the setting unit 30, and the difference calculator 31 are implemented by the processing circuitry 81.

The processing circuitry 81 is dedicated hardware. The processing circuitry 81 is, for example, a single circuit, a composite circuit, a programmed processor, a parallel-programmed processor, an Application Specific Integrated Circuit (ASIC), an Field-Programmable Gate Array (FPGA), or a combination of thereof.

While there are a plurality of functions of the selection unit 27, the control unit 29, the setting unit 30, and the difference calculator 31, it is allowable that some of the functions are implemented in software or firmware and the other functions are implemented in dedicated hardware. In this manner, the functions of the selection unit 27, the control unit 29, the setting unit 30, and the difference calculator 31 can be implemented by hardware, software, firmware, or a combination of thereof.

The configurations described in the above embodiments are only examples of the content of the present invention. The configurations can be combined with other well-known techniques, and part of the configurations can be omitted or modified without departing from the scope of the present invention.

REFERENCE SIGNS LIST 1, 52 charging-discharging device, 2 EV, 3 commercial system, 4 solar power generation system, 5 household load, 6 Internet, 7 remote control device, 11 power converter, 12 first power detector, 13 first power path, 14 second power detector, 15 second power path, 16 third power detector, 17 third power path, 18 switching device, 19 fourth power detector, 20 fourth power path, storage battery, 22 connector cable, 23 determination unit, 24 storage unit, 25 first communication unit, 26 second communication unit, 27 selection unit, 28 management unit, 29 control unit, 30 setting unit, 31 difference calculator, 41 solar cell array, 42 solar power-generation power converter, 50 charging-discharging system, 71 processor, 72 memory, 81 processing circuitry.

The invention claimed is:

1. A charging-discharging device comprising:
a power converter to convert AC power supplied for charging a storage battery to DC power, and convert DC power discharged from the storage battery to AC power;
a first power detector to detect AC power supplied from a commercial system and detect AC power to be supplied to the commercial system;
a second power detector to detect AC power supplied from a solar power generation system that generates power using solar light;
a third power detector to detect AC power supplied from the power converter and detect AC power to be supplied to the power converter;
a fourth power detector to detect AC power to be supplied to an electric load that consumes power;
a memory to store therein load power value data indicating a load power value that is a power value detected by the fourth power detector, estimated local solar-radiation data indicating estimation of solar radiation in a local area including a location where the solar power generation system is installed, operational mode data indicating an operational mode that identifies a power utilization method, price data indicating a price of AC power to be supplied from the commercial system and a price of AC power to be supplied to the commercial system, power conversion efficiency data indicating power conversion efficiency of the power converter at a time of charging or discharging the storage battery, and current time data indicating a current time;
a selector to acquire estimated load power data indicating estimation of power to be consumed by the electric load on a basis of the load power value data stored in the memory, to acquire estimated solar power-generation power data indicating estimation of power to be generated by the solar power generation system on a basis of the estimated local solar-radiation data stored in the memory, and to select one of a plurality of specific operations regarding usage of power on a basis of the estimated load power data acquired and the estimated solar power-generation power data acquired, and on a basis of the operational mode data, the price data, the power conversion efficiency data, and the current time data that are stored in the memory; and
a controller to control operation of the power converter on a basis of power values detected respectively by the first power detector, the second power detector, and the third power detector, and on a basis of an operation selection result that is a result of selection made by the selector, wherein
a first operational mode is defined as an economy mode in which when an amount of AC power generated by the solar power generation system is greater than an amount of AC power consumed by the electric load, a surplus-power selling operation is performed to sell power to the commercial system, and when an amount of AC power generated by the solar power generation system is less than an amount of AC power consumed by the electric load, a power-shortage discharging operation is performed to discharge the storage battery to supply power stored in the storage battery to the electric load,
a second operational mode is defined as a green mode in which when an amount of AC power generated by the solar power generation system is greater than an amount of AC power consumed by the electric load, a surplus-power charging operation is performed to charge the storage battery, and when an amount of AC power generated by the solar power generation system is less than an amount of AC power consumed by the electric load, the power-shortage discharging operation is performed,
a third operational mode is defined as a mode in which either the first operational mode or the second operational mode, whichever is more economically efficient, is selected, and
when an operational mode indicated by the operational mode data is the third operational mode, the selector creates estimated surplus/shortage power data indicating an estimated value obtained by subtracting a value of AC power to be generated by the solar power generation system from a value of AC power to be consumed by the electric load on a basis of the estimated load power data and the estimated solar power-generation power data, the selector calculates a first economic value indicating economic efficiency when an operation is performed in the first operational mode for a predetermined period of time, and calculates a second economic value indicating economic efficiency when an operation is performed in the second operational mode for the predetermined period of time on a basis of the estimated surplus/shortage power data created, the price data, and the power conversion efficiency data, and the selector compares the first economic value and the second economic value to each other to select a specific operation in either the first operational mode or the second operational mode, whichever is more economically efficient.

2. The charging-discharging device according to claim 1, wherein
the solar power generation system includes a solar cell array to generate power using solar light,
the memory further stores therein performance data indicating performance of the solar cell array, and
the selector acquires the estimated solar power-generation power data from a current time to a time after a predetermined period of time on a basis of the estimated local solar-radiation data and the performance data that are stored in the memory.

3. A charging-discharging system comprising:
a power converter to convert AC power supplied for charging a storage battery to DC power, and convert DC power discharged from the storage battery to AC power;
a first power detector to detect AC power supplied from a commercial system and detect AC power to be supplied to the commercial system;
a second power detector to detect AC power supplied from a solar power generation system that generates power using solar light;
a third power detector to detect AC power supplied from the power converter and detect AC power to be supplied to the power converter;
a fourth power detector to detect AC power to be supplied to an electric load that consumes power;
a memory to store therein load power value data indicating a load power value that is a power value detected by the fourth power detector, estimated local solar-radiation data indicating estimation of solar radiation in a local area including a location where the solar power generation system is installed, operational mode data indicating an operational mode that identifies a power utilization method, price data indicating a price of AC power to be supplied from the commercial system and a price of AC power to be supplied to the commercial system, power conversion efficiency data indicating power conversion efficiency of the power converter at a time of charging or discharging the storage battery, and current time data indicating a current time;
a selector to acquire estimated load power data indicating estimation of power to be consumed by the electric load on a basis of the load power value data stored in the memory, to acquire estimated solar power-generation power data indicating estimation of power to be generated by the solar power generation system on a basis of the estimated local solar-radiation data stored in the memory, and to select one of a plurality of specific operations regarding usage of power on a basis of the estimated load power data acquired and the estimated solar power-generation power data acquired, and on a basis of the operational mode data, the price data, the power conversion efficiency data, and the current time data that are stored in the memory; and
a controller to control operation of the power converter on a basis of power values detected respectively by the first power detector, the second power detector, and the third power detector, and on a basis of an operation selection result that is a result of selection made by the selector, wherein
a first operational mode is defined as an economy mode in which when an amount of AC power generated by the solar power generation system is greater than an amount of AC power consumed by the electric load, a surplus-power selling operation is performed to sell power to the commercial system, and when an amount of AC power generated by the solar power generation system is less than an amount of AC power consumed by the electric load, a power-shortage discharging operation is performed to discharge the storage battery to supply power stored in the storage battery to the electric load,
a second operational mode is defined as a green mode in which when an amount of AC power generated by the solar power generation system is greater than an amount of AC power consumed by the electric load, a surplus-power charging operation is performed to charge the storage battery, and when an amount of AC power generated by the solar power generation system is less than an amount of AC power consumed by the electric load, the power-shortage discharging operation is performed,
a third operational mode is defined as a mode in which either the first operational mode or the second operational mode, whichever is more economically efficient, is selected, and
when an operational mode indicated by the operational mode data is the third operational mode, the selector creates estimated surplus/shortage power data indicating an estimated value obtained by subtracting a value of AC power to be generated by the solar power generation system from a value of AC power to be consumed by the electric load on a basis of the estimated load power data and the estimated solar power-generation power data, the selector calculates a first economic value indicating economic efficiency when an operation is performed in the first operational mode for a predetermined period of time, and calculates a second economic value indicating economic efficiency when an operation is performed in the second operational mode for the predetermined period of time on a basis of the estimated surplus/shortage power data created, the price data, and the power conversion efficiency data, and the selector compares the first economic value and the second economic value to each other to select a specific operation in either the first operational mode or the second operational mode, whichever is more economically efficient.

4. A charging-discharging control method for controlling a charging-discharging system including a power converter to convert AC power supplied for charging a storage battery to DC power, and convert DC power discharged from the storage battery to AC power, a first power detector to detect AC power supplied from a commercial system and detect AC power to be supplied to the commercial system, a second power detector to detect AC power supplied from a solar power generation system that generates power using solar light, a third power detector to detect AC power supplied from the power converter and detect AC power to be supplied to the power converter, and a fourth power detector to detect AC power to be supplied to an electric load that consumes power, the charging-discharging control method comprising:

acquiring estimated load power data indicating estimation of power to be consumed by the electric load on a basis of load power value data indicating a load power value that is a power value detected by the fourth power detector;

acquiring estimated solar power-generation power data indicating estimation of power to be generated by the solar power generation system on a basis of estimated local solar-radiation data indicating estimation of solar radiation in a local area including a location where the solar power generation system is installed;

selecting one of a plurality of specific operations regarding usage of power on a basis of the estimated load power data acquired and the estimated solar power-generation power data acquired, and on a basis of operational mode data indicating an operational mode that identifies a power utilization method, price data indicating a price of AC power to be supplied from the commercial system and a price of AC power to be supplied to the commercial system, power conversion efficiency data indicating power conversion efficiency of the power converter at a time of charging or discharging the storage battery, and current time data indicating a current time; and controlling operation of the power converter on a basis of power values detected respectively by the first power detector, the second power detector, and the third power detector, and on a basis of the one specific operation selected, wherein a first operational mode is defined as an economy mode in which when an amount of AC power generated by the solar power generation system is greater than an amount of AC power consumed by the electric load, a surplus-power selling operation is performed to sell power to the commercial system, and when an amount of AC power generated by the solar power generation system is less than an amount of AC power consumed by the electric load, a power-shortage discharging operation is performed to discharge the storage battery to supply power stored in the storage battery to the electric load, a second operational mode is defined as a green mode in which when an amount of AC power generated by the solar power generation system is greater than an amount of AC power consumed by the electric load, a surplus-power charging operation is performed to charge the storage battery, and when an amount of AC power generated by the solar power generation system is less than an amount of AC power consumed by the electric load, the power-shortage discharging operation is performed, a third operational mode is defined as a mode in which either the first operational mode or the second operational mode, whichever is more economically efficient, is selected, and when an operational mode indicated by the operational mode data is the third operational mode, estimated surplus/shortage power data is created, the estimated surplus/shortage power data indicating an estimated value obtained by subtracting a value of AC power to be generated by the solar power generation system from a value of AC power to be consumed by the electric load on a basis of the estimated load power data and the estimated solar power-generation power data, a first economic value is calculated, the first economic value indicating economic efficiency when an operation is performed in the first operational mode for a predetermined period of time, a second economic value is calculated, the second economic value indicating economic efficiency when an operation is performed in the second operational mode for the predetermined period of time on a basis of the estimated surplus/shortage power data created, the price data, and the power conversion efficiency data, the first economic value and the second economic value are compared to each other, and a specific operation is selected, the specific operation being an operation in either the first operational mode or the second operational mode, whichever is more economically efficient.

* * * * *